US012548921B2

(12) United States Patent
Huang et al.

(10) Patent No.: US 12,548,921 B2
(45) Date of Patent: Feb. 10, 2026

(54) MULTI-ANTENNA MODULE SYSTEM

(71) Applicant: Arcadyan Technology Corporation, Hsinchu (TW)

(72) Inventors: Chih-Yung Huang, Taichung (TW); Ting-Ren Li, Hsinchu County (TW)

(73) Assignee: Arcadyan Technology Corporation, Hsinchu (TW)

( * ) Notice: Subject to any disclaimer, the term of this patent is extended or adjusted under 35 U.S.C. 154(b) by 293 days.

(21) Appl. No.: 18/139,337

(22) Filed: Apr. 25, 2023

(65) Prior Publication Data

US 2024/0136735 A1 Apr. 25, 2024
US 2024/0235060 A9 Jul. 11, 2024

(30) Foreign Application Priority Data

May 12, 2022 (TW) ................................. 111117837

(51) Int. Cl.
*H01Q 21/24* (2006.01)
*H01Q 3/02* (2006.01)

(52) U.S. Cl.
CPC ............... *H01Q 21/24* (2013.01); *H01Q 3/02* (2013.01)

(58) Field of Classification Search
CPC ............ H01Q 21/24; H01Q 3/02; H01Q 1/38; H01Q 21/28; H01Q 1/525; H01Q 1/2291; H01Q 5/28; H01Q 5/50; H01Q 21/0006
See application file for complete search history.

(56) References Cited

U.S. PATENT DOCUMENTS 8,456,365 B2 * 6/2013 Pros ....................... H01Q 5/307 343/702
2016/0064830 A1 * 3/2016 Jervis ..................... H01Q 9/285 343/798

(Continued)

FOREIGN PATENT DOCUMENTS

TW M388116 U 9/2010

OTHER PUBLICATIONS

S.-W. Su, C.-T. Lee and S.-C. Chen, “Compact, Printed, Tri-Band Loop Antenna With Capacitively-Driven Feed and End-Loaded Inductor for Notebook Computer Applications,” in IEEE Access, vol. 6, pp. 6692-6699, 2018, doi: 10.1109/ACCESS.2018.2794606 (Year: 2018).*

(Continued)

*Primary Examiner* — Dieu Hien T Duong
*Assistant Examiner* — Austin M Back
(74) *Attorney, Agent, or Firm* — Innovation Counsel LLP

(57) ABSTRACT

A multi-antenna module system includes a substrate, a plurality of first antenna modules, a plurality of second antenna modules, and a plurality of third antenna modules. The substrate has an opening. The first antenna modules are respectively disposed on the substrate and located on two opposite first sides and two opposite second sides for transmitting and receiving a first frequency band signal. The second antenna modules are respectively disposed on the substrate and located on two opposite third sides for transmitting and receiving a second frequency band signal. The third antenna modules are respectively disposed on the substrate and located on two opposite third sides and two opposite fourth sides for transmitting and receiving a third frequency band signal. The second antenna modules and the third antenna modules are respectively located between the first antenna modules.

10 Claims, 4 Drawing Sheets

(56) References Cited

U.S. PATENT DOCUMENTS

| | | | | |
|---|---|---|---|---|
| 2019/0148839 | A1 | 5/2019 | Lin et al. | |
| 2020/0127389 | A1* | 4/2020 | Li | H01Q 25/001 |
| 2020/0212599 | A1* | 7/2020 | Liang | H01Q 21/28 |
| 2020/0335879 | A1 | 10/2020 | Boutayeb et al. | |
| 2020/0411994 | A1* | 12/2020 | Chen | H01Q 9/0407 |
| 2021/0226650 | A1* | 7/2021 | Zhao | H04B 7/0408 |
| 2022/0085497 | A1* | 3/2022 | Khripkov | H01Q 21/28 |
| 2022/0263251 | A1* | 8/2022 | Nabki | H01Q 9/40 |

OTHER PUBLICATIONS

Search Report issued by EPO on Sep. 28, 2023, 9 pages.
Taiwan Office Action corresponding to Application No. 111117837 and issued on May 9, 2023, 5 pages.

* cited by examiner

MULTI-ANTENNA MODULE SYSTEM

This application claims the benefit of Taiwan application Serial No. 111117837, filed May 12, 2022, the subject matter of which is incorporated herein by reference.

BACKGROUND OF THE INVENTION

Field of the Invention

The invention relates in general to an antenna module, and more particularly to a multi-antenna module system.

Description of the Related Art

Since current electronic products are developing towards light, thin, and small, the miniaturization trend of various circuits in electronic products is designed. With the need to support multi-frequency applications, the antennas in electronic products have to consider the miniaturization design. Especially in the application of broadband networks and multimedia services, the tri-band antenna can provide three resonance modes, so that the tri-band antenna can operate in three different resonance frequency bands to cover a broader bandwidth.

However, the traditional tri-band antenna is a three-dimensional antenna, which takes up space due to its large size and complex structure. It is hard to adjust the frequency required by the antenna. Therefore, the costs for molding and assembling required for the three-dimensional antenna are high, and the three-dimensional antenna has the risk of being easily deformed and needs further improvement.

In addition, when the antenna structure is a multi-input multi-output (MIMO) antenna, multiple antennas are squeezed into a limited area, and signals between these antennas will inevitably interfere.

SUMMARY OF THE INVENTION

The present invention relates to a multi-antenna module system, which can integrate multiple antenna modules on the same substrate to support wireless communication devices with multiple frequency bands such as 4G/LTE, 5G/Sub6G, Wi-Fi, and the combinations thereof.

According to an embodiment of the present invention, a multi-antenna module system is provided, which includes a substrate, a plurality of first antenna modules, a plurality of second antenna modules, and a plurality of third antenna modules. The substrate has an opening, two opposite first sides, two opposite second sides, two opposite third sides, and two opposite fourth sides. The first antenna modules are respectively arranged on the substrate and located on the two opposite first sides and the two opposite second sides, each of the first antenna modules has a first signal feed-in terminal and a first ground terminal for connecting a first set of cables to transmit and receive a first frequency band signal. The second antenna modules are respectively arranged on the substrate and located on the two opposite third sides, and each of the second antenna modules has a second signal feed-in terminal and a second ground terminal for connecting a second set of cables to transmit and receive a second frequency band signal. The third antenna modules are respectively arranged on the substrate and located on the two opposite third sides and the two opposite fourth sides, each of the third antenna modules has a third signal feed-in terminal and a third ground terminal for connecting a third set of cables to transmit and receive a third frequency band signal. The second antenna modules and the third antenna modules are respectively located between the first antenna modules.

The above and other aspects of the invention will become better understood with regard to the following detailed description of the preferred but non-limiting embodiment(s). The following description is made with reference to the accompanying drawings.

DETAILED DESCRIPTION OF THE INVENTION

Below in conjunction with the accompanying drawings in the embodiments of the application, the technical solutions in the embodiments of the application are clearly and completely described. Obviously, the described embodiments are part of the embodiments of the application rather than all embodiments. Based on the embodiments in the present application, all other embodiments obtained by a person having ordinary skill in the art on the premise of being obvious belong to the protection scope of the present application. The same/similar symbols are used to represent the same/similar components in the following description.

Figure 1:
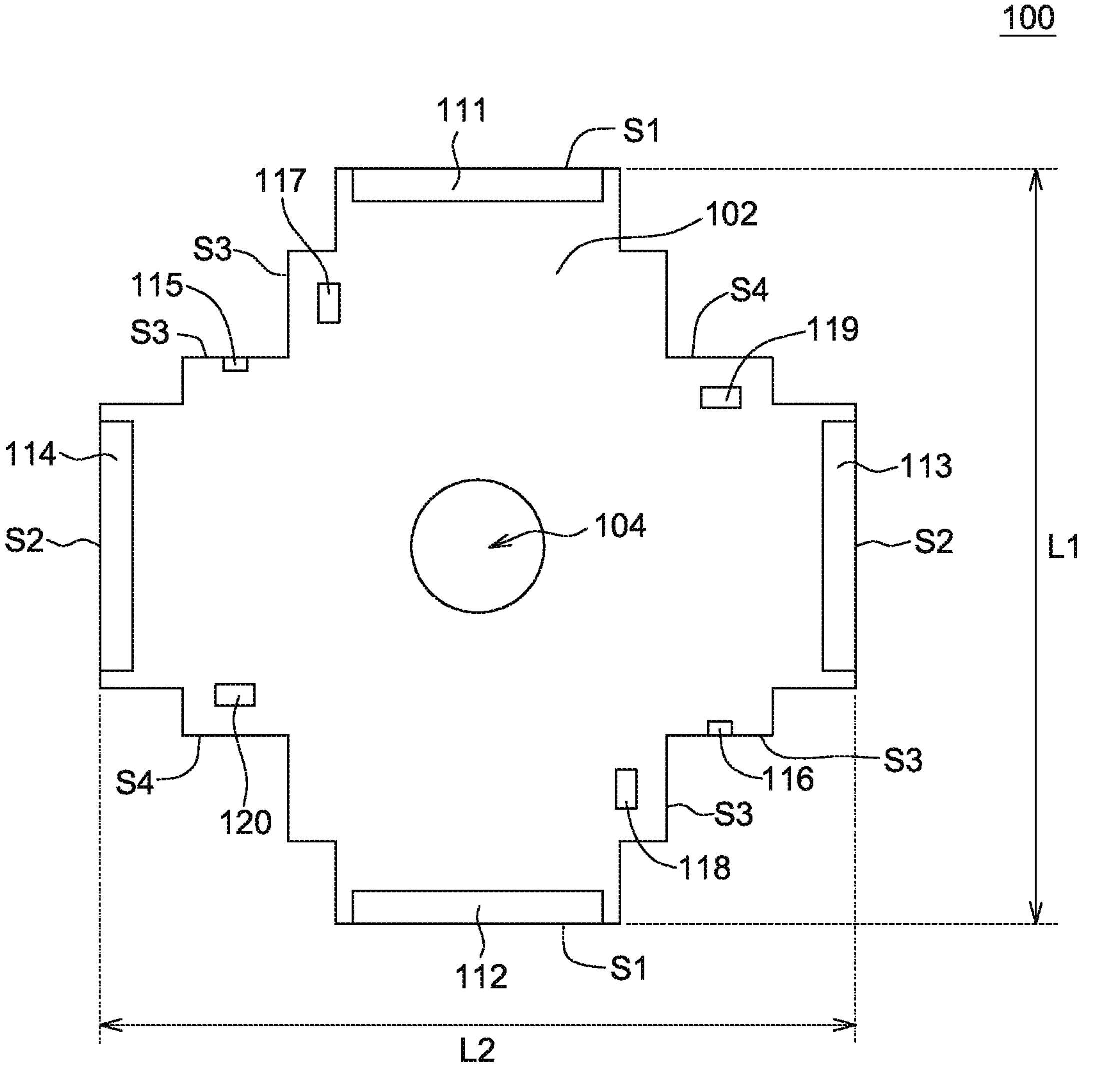
FIG. 1 is a schematic view of a multi-antenna module system according to an embodiment of the present invention.
Figure 2:
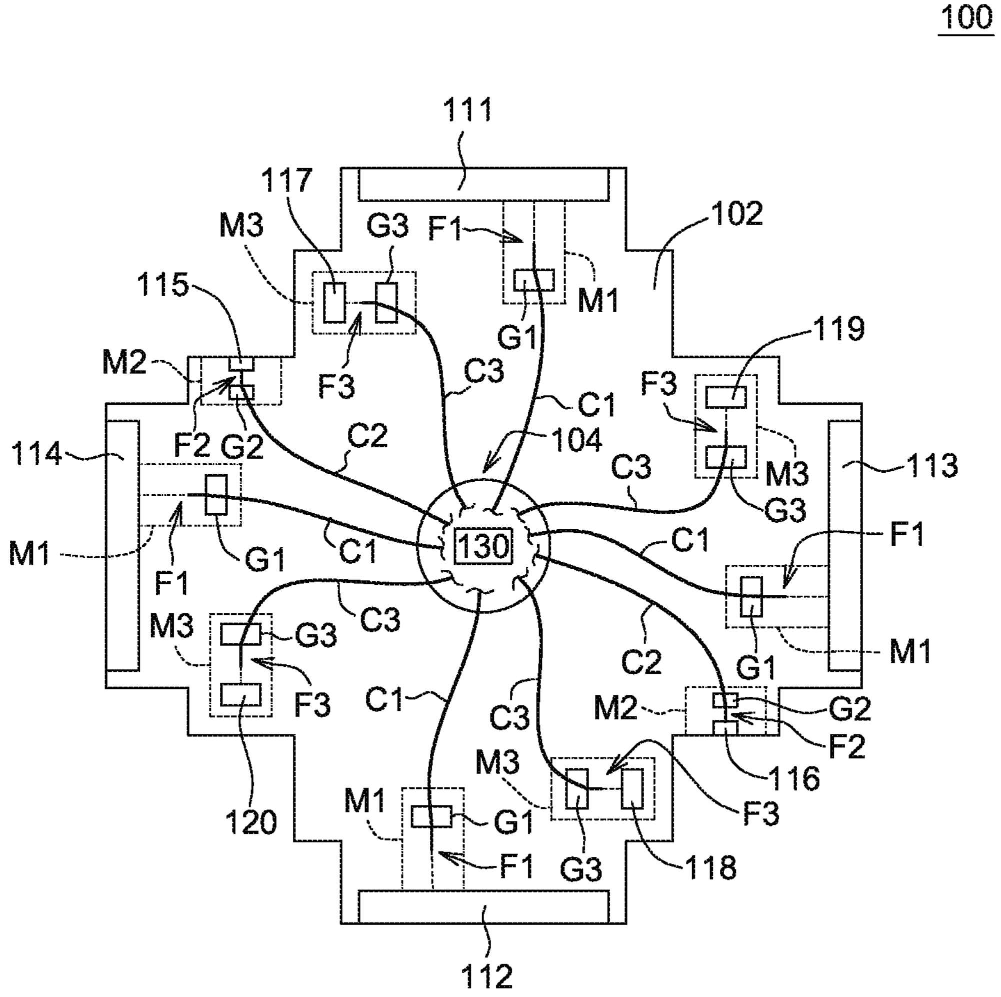
FIG. 2 is a schematic view of a multi-antenna module system connected to a radio frequency signal module by a plurality of cables according to an embodiment of the present invention.

Refer to FIGS. 1 and 2. FIG. 1 is a schematic view of a multi-antenna module system 100 according to an embodiment of the present invention, and FIG. 2 is a schematic view of a multi-antenna module system 100 connected to a radio frequency (RF) signal module 130 by a plurality of cables C1-C3 according to an embodiment of the present invention. The system 100 provides printed multi-frequency antenna modules that are easy to adjust the frequency band to achieve system application. The antenna signal feed-in design is, for example, directly using 50 ohm (Ω) cables C1-C3 having the inner conductive layer and the outer conductive layer to be solder on signal feed-in terminals F1-F3 and ground terminals G1-G3 of each antenna module, respectively, and the other ends of the cables C1-C3 can be freely extended to the RF signal module 130 (see FIG. 2). The RF signal module 130 can transmit and receive RF signals of multiple frequency bands through the cables C1-C3.

The multi-antenna module system 100 can be operated on a printed circuit board with a ground plane. The multi-antenna module system 100 includes a substrate 102, a plurality of first antenna modules 111-114, and a plurality of second antenna modules 115-116, and a plurality of third antenna modules 117-120. The number of antenna modules, required frequency bands, and polarization directions can be adjusted and corrected according to product requirements to achieve suitable applications. It can be applied to wireless communication devices with multi-frequency bands, such as 802.11a (5150-5850 MHz), 802.11b (2400-2500 MHz), and 802.11g (2400-2500 MHz), 802.11n (2.4 GHz/5 GHz Band), 802.11ac (5 GHz Band), 802.11ax (2.4 GHz/5 GHz/6 GHz Band), or can be slightly adjusted in the frequency band and applied to the wireless communication devices with other working frequency bands, for example, it can be applied to wireless communication devices such as ODU (OutDoor Unit), IDU (InDoor Unit), and CPE (Customer Premises Equipment).

In the present embodiment, the quantity of the first antenna modules 111-114 can be four or more, the quantity of the second antenna modules 115-116 can be two or more, and the quantity of the third antenna modules 117-120 may be four or more, but the present invention is not limited thereto.

The first antenna modules 111-114 and the third antenna modules 117-120 can respectively support 4×4 multi-channel input multi-channel output (MIMO) or higher wireless communication technology, the second antenna modules 115-116 and the first antenna modules 111-112 can be supplied to support 4×4 multi-input multi-output (MIMO) or higher wireless communication technology, so as to be applied to wireless transmission of various handheld electronic devices, portable computers, cellphone devices or smart Modems.

In addition, the operating frequency band of the first antenna module 111-114 can be between 600 MHz-6000 MHz, and the commonly used frequency bands include the low-frequency band of 746-894 MHz, the intermediate frequency band of 1710 MHz-2690 MHz and high frequency band of 3300 MHz-5925 MHz. The operating frequency band of the second antenna modules 115-116 can range between 3300 MHz-5000 MHz. The frequency bands of the third antenna modules 117-120 can range between 2400 MHz-2500 MHz and 5150 MHz-5850 MHz, but the present invention is not limited thereto.

The substrate 102 has an opening 104, with two first opposite sides S1, two second opposite sides S2, two third opposite sides S3, and two fourth opposite sides S4. The opening 104 may be located at the center of substrate 102. The two first sides S1 are long opposite sides separated by a predetermined first distance L1 and located in the vertical directions of substrate 102. The two second sides S2 are long opposite sides separated by a predetermined second distance L2 and located in the horizontal directions of substrate 102. The first distance L1 and the second distance L2 may be equal or unequal, and the first distance L1 and the second distance L2 are, for example, 120 mm or longer.

The first distance L1 is, for example, a quarter of the wavelength of the low-frequency band required by the first antenna modules 111-114, so as to meet the current path length required for the low-frequency band of the antenna to generate resonance. Similarly, the second distance L2 is, for example, a quarter of the wavelength of the low-frequency band required by the first antenna modules 111-114, so as to meet the current path length required for the low-frequency band of the antenna to generate resonance.

In the present embodiment, the first antenna modules 111-114 are respectively arranged on the substrate 102 and located on the two opposite first sides S1 and the two opposite second sides S2, each of the first antenna modules 111-114 has a first signal feed-in terminal F1 and a first ground terminal G1 for connecting the first set of cables C1 to transmit and receive a first frequency band signal. The first frequency band signals transmitted and received by the first antenna modules 111-114 include low-frequency, intermediate frequency, and high-frequency bands. That is, the first antenna modules 111-114 can be tri-band antenna modules. Each of the first antenna modules 111-114 has a circuit for adjusting current coupling and impedance matching of the antenna (hereinafter referred to as a first impedance matching adjustment region M1 or circuit) to reduce the return loss. The first impedance matching adjustment region M1 is, for example, a π-type matching circuit or other equivalent circuits.

In an embodiment, the first antenna modules 111 and 112, located on the two opposite first sides S1 have the same first polarization direction, and the first antenna modules 113 and 114, located on the two opposite second sides S2 have the same second polarization direction. The first and second polarization directions are different, so two electromagnetic fields with different polarization directions are generated.

In another embodiment, the two first antenna modules 111 and 114, located on the first side S1 and the second side S2 adjacent to each other, have the same polarization direction. The other two first antenna modules 112 and 113, on another first side S1 and another second side S2 adjacent to each other, have the same polarization direction. That is to say, the first antenna modules 111 and 112 on the two opposite first sides S1, respectively, have a first and second polarization direction. The first antenna modules 114 and 113 on the two opposite second sides S2, respectively, have a first and second polarization direction. The first polarization direction is different from the second, which can generate different polarizations, and thus two opposite electromagnetic fields with different polarization directions are generated.

In addition, the second antenna modules 115-116 are respectively arranged on the substrate 102 and are located on the two opposite third sides S3, and each of the second antenna modules 115-116 has a second signal feed-in terminal F2 and a second ground terminal G2 used to connect a second set of cables C2 to transmit and receive a second frequency band signal, for example, a 5 GHz frequency band signal. Each of the second antenna modules 115-116 has a circuit for adjusting current coupling and impedance matching of the antenna (hereinafter referred to as a second impedance matching adjustment region M2 or circuit) to reduce return loss. The second impedance matching adjustment region M2 is, for example, a π-type matching circuit or other equivalent circuits.

In addition, the third antenna modules 117-120 are respectively arranged on the substrate 102 and located on the two opposite third sides S3 and the two opposite fourth sides S4, each of the third antenna modules 117-120 has a third signal feed-in terminal F3 and a third ground terminal G3 used to connect a third set of cables C3 to transmit and receive a third frequency band signal, such as a Wi-Fi frequency band signal. Each of the third antenna modules 117-120 has a circuit for adjusting current coupling and impedance matching of the antenna (hereinafter referred to as a third impedance matching adjustment region M3 or circuit) to reduce return loss. The third impedance matching adjustment region M3 is, for example, a π-type matching circuit or other equivalent circuits.

The positions of the second antenna modules 115-116 and the third antenna modules 117-120 can be adjusted according to the requirements of different radiation patterns, and the type is not limited. In the present embodiment, starting from the first antenna module 111, the clockwise antenna arrangement is as follows: the first antenna module 111, the third antenna module 119, the first antenna module 113, the second antenna module 116, the third antenna module 118, the first antenna module 112, the third antenna module 120, the first antenna module 114, the second antenna module 115, and the third antenna module 117. When the shape of substrate 102 changes, the positions of the second antenna modules 115-116 and the third antenna modules 117-120 also change accordingly.

With respect to the first side S1 and the second side S2, the distance between the two opposite third sides S3 can be less than the first distance L1 and the second distance L2, and the distance between the two opposite fourth sides S4 can be less than the first distance L1 and the second distance L2. The distance between the two opposite third sides S3 depends on a quarter of the wavelength of the frequency band required by the second antenna modules 115-116 or the third antenna modules 117-120, so as to meet the current path length required for the antenna frequency band to generate resonance. The distance between the two opposite fourth sides S4 depends on a quarter of the wavelength of the frequency band required by the third antenna modules 117-120, so as to meet the current path length required for the antenna frequency band to generate resonance.

In the present embodiment, the second antenna modules 115-116 and the third antenna modules 117-120 are located between the first antenna modules 111-114. That is to say, the third sides S3 and the fourth sides S4 are located between the two opposite first sides S1 and the two opposite second sides S2. This arrangement allows the second antenna modules 115-116 and the third antenna modules 117-120 with different frequency bands from that of the first antenna modules 111-114 to be employed between the first antenna modules 111-114 operating on the same band, thereby reducing the interference and increasing the isolation of the signals transmitted and received by the first to third antenna modules.

Referring to FIGS. 1 and 2, the first set of cables C1, the second set of cables C2 and the third set of cables C3 are connected to the RF signal module 130 through the opening 104. The RF signal module 130 can be placed in any other position, not limited to being located under the multi-antenna module. In addition, the substrate 102 is a cross-shaped or cross-like substrate, and the cross-like substrate 102 has four long sides and a plurality of sections, and the four long sides are the above-mentioned two opposite first sides S1 and two opposite second sides S2. Each of the sections is recessed inwardly between two adjacent long sides and is generally distributed in a step. That is to say, the sections refer to the above-mentioned third sides S3 and fourth sides S4 and generally distribute in steps so that the second antenna modules 115-116 and the third antenna modules 117-120 are located in the sections of the cross-like substrate 102.

Figure 3:
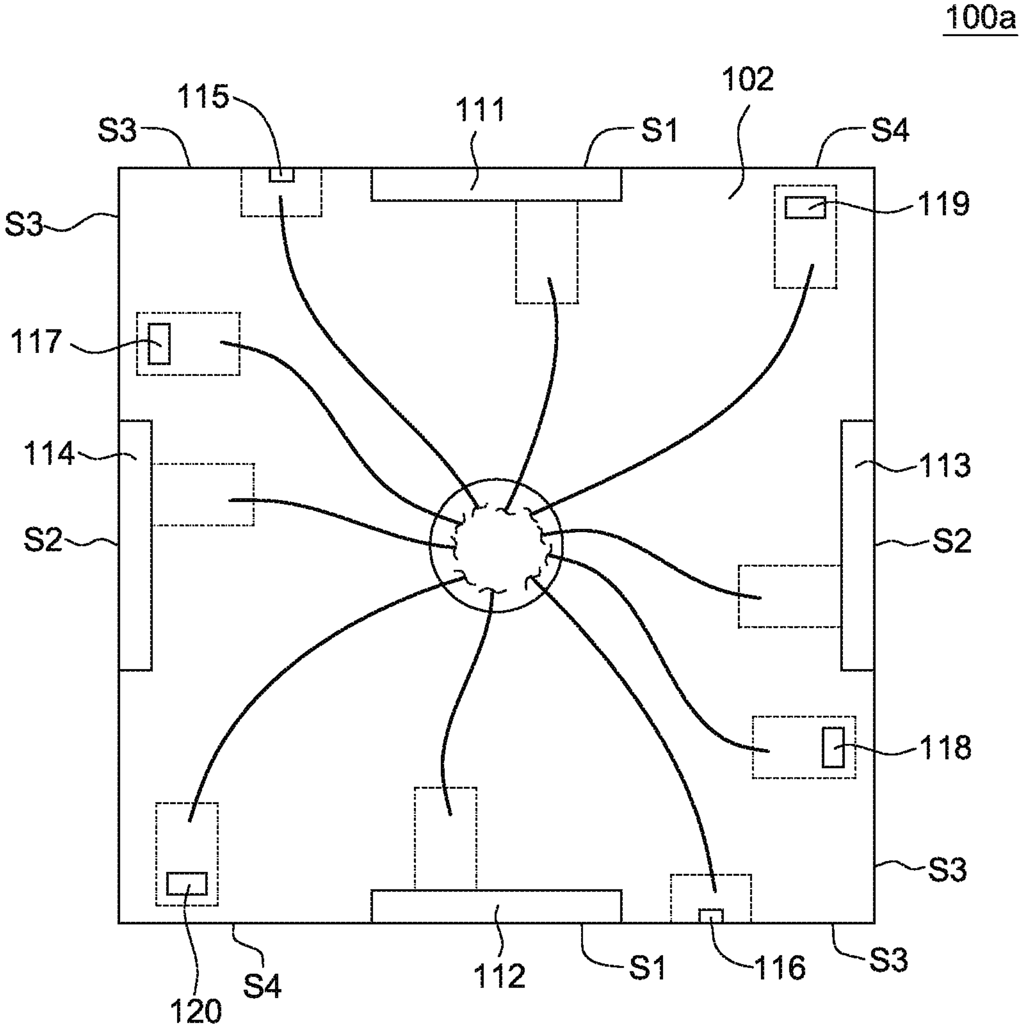
FIGS. 3 and 4 are, respectively, schematic views of a multi-antenna module system according to another embodiment of the present invention.
Figure 4:
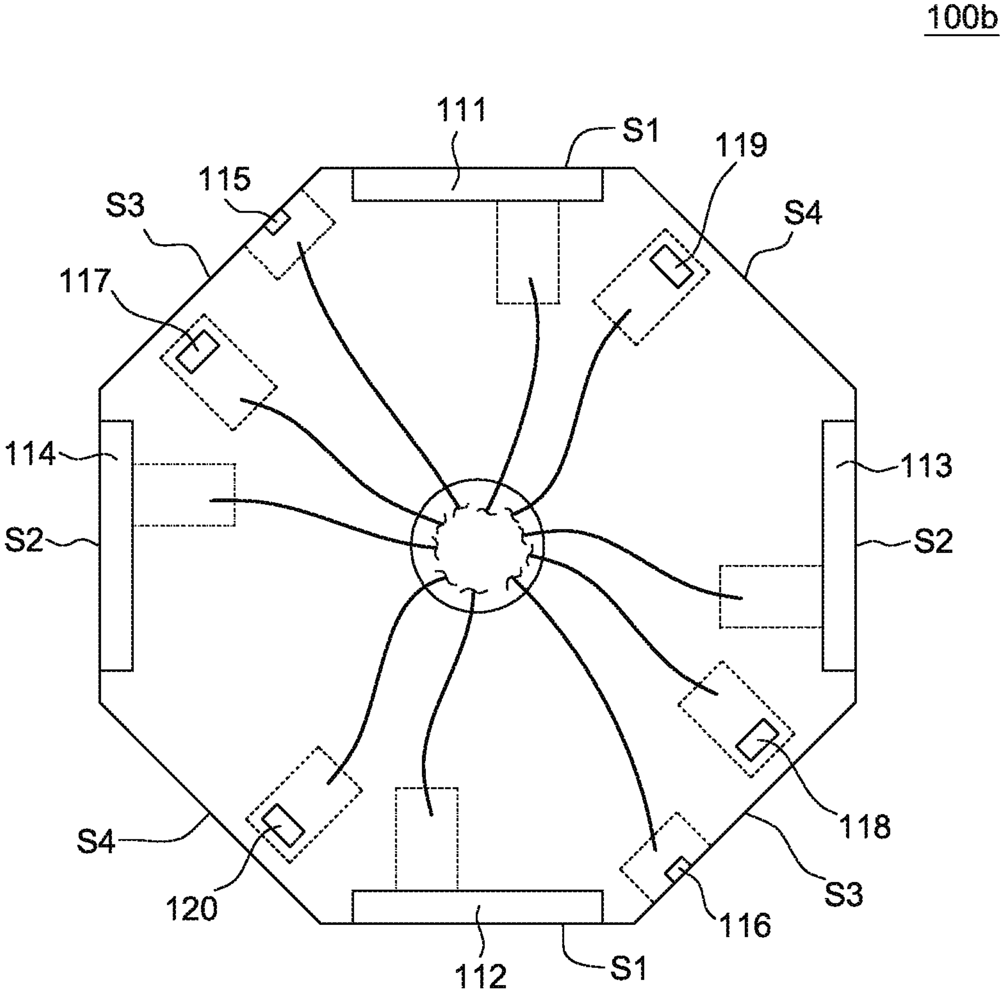

Referring to FIG. 3 and FIG. 4, which are respectively schematic views of multi-antenna module systems 100*a* and 100*b* according to another embodiment of the present invention. In FIG. 3, the difference from the above-mentioned embodiments is that, the substrate 102 is, for example, a square substrate. The square substrate 102 has four sides and four corners, wherein the first antenna modules 111-114 are located at the four sides of the square substrate 102, the second antenna modules 115-116 and the third antenna modules 117-120 are located at the four corners of the square substrate 102. That is to say, the above-mentioned two opposite third sides S3 and two opposite fourth sides S4 correspond to the four corners (L-shaped sides) of the square substrate 102, and the two opposite third sides S3 and the two opposite fourth sides S4 are vertically connected between the adjacent first side S1 and the second side S2, respectively.

In addition, in FIG. 4, the difference from the above-mentioned embodiment is that, the substrate 102 is an octagonal substrate, and the octagonal substrate 102 has eight sides, and these eight sides are, for example, equal in length or unequal in length. The eight sides correspond to the above-mentioned two opposite first sides S1, two opposite second sides S2, two opposite third sides S3 and the two opposite fourth sides S4, wherein the two opposite third sides S3 and the two opposite fourth sides S4 located between the opposite first side S1 and the two opposite second sides S2, and the third side S3 and the fourth side S4 are obliquely connected between one of the two opposite first sides S1 and one of the two opposite second sides S2, respectively. The inclination angle is, for example, 120 degrees.

The currently popular fifth-generation mobile network 5G/Sub6G specifically defines the specification for multi-frequency support in terms of bandwidth and can provide more frequency bands in the future to integrate, such as Wi-Fi/2.4 GHz, 4G/LTE, 5 GHz/Sub6G or other frequency bands on the same substrate 102. In addition to the continuation of related communication technologies, wireless networks with higher bandwidth and transmission rates are also available and very attractive to users. In terms of signal transmission, the method to feed in the antenna signal is, for example, directly using a 50-ohm (Ω) cable to be soldered on the signal feed-in terminal and ground terminal of the printed circuit board and the other end of the cable can be freely extended to the RF signal module. In the present embodiment, since the antenna modules of the system are directly soldered on the printed circuit board, the mold manufacturing cost and assembly cost of the three-dimensional antenna is saved, and the risk of deformation of the three-dimensional antenna can be avoided. The multi-antenna module system 100 can be operated on a printed circuit board with the ground plane, which is not easily disturbed by the system ground and has the advantage of multiple selectivities. The independent adjustment mechanism of the multi-antenna module system 100 can facilitate the system with different applications.

In addition, the multi-antenna module system 100, according to the present embodiment, can be held on a rotatable antenna base, wherein the substrate 102 is fixed on the antenna base through a combination of a motor and a bearing and is driven by a controller to rotate so that the antenna modules can achieve the purpose of being rotatable. In the multi-antenna module system 100 of the present embodiment, the antenna modules are evenly distributed on the substrate 102 and receive radio frequency signals from different directions, and can scan the direction with stronger signal strength or match with various antenna radiation field designs, such that the antenna modules can rotate to the desired orientation for users to use, and has the outstanding feature of optimizing the integration of different frequency bands for wireless communication.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-antenna module system, comprising:

a substrate having an opening, two opposite first sides, two opposite second sides, two opposite third sides, and two opposite fourth sides;

a plurality of first antenna modules respectively arranged on the substrate and located on the two opposite first sides and the two opposite second sides, each of the first antenna modules has a first signal feed-in terminal and a first ground terminal for connecting a first set of cables to transmit and receive a first frequency band signal;

a plurality of second antenna modules respectively arranged on the substrate and located on the two opposite third sides, each of the second antenna modules has a second signal feed-in terminal and a second ground terminal for connecting a second set of cables to transmit and receive a second frequency band signal; and a plurality of third antenna modules respectively arranged on the substrate and located on the two opposite third sides and the two opposite fourth sides, each of the third antenna modules has a third signal feed-in terminal and a third ground terminal for connecting a third set of cables to transmit and receive a third frequency band signal, wherein each of the first, second, and third antenna modules respectively comprises an independent impedance-matching circuit tuned to a corresponding low, middle or high frequency band so as to reduce return loss and suppress mutual coupling among the frequency bands, wherein the second antenna modules and the third antenna modules are respectively located between the first antenna modules adjacent to each other to geometrically isolate different frequency-band signals, wherein the two opposite first sides of the substrate are separated by a first distance that corresponds to one-quarter of a wavelength of the low frequency band transmitted and received by the first antenna modules.

2. The system according to claim 1, further comprising a radio frequency (RF) signal module, wherein the first set of cables, the second set of cables, and the third set of cables are connected to the RF signal module through the opening.

3. The system according to claim 1, wherein the two opposite second sides of the substrate are separated by a second distance, and the second distance is a quarter of a wavelength of the low frequency band.

4. The system according to claim 1, wherein the substrate is a cross-shaped or cross-like substrate, the cross-shaped or cross-like substrate has four long sides and a plurality of sections, wherein the first antenna modules are located on the four long sides of the cross-shaped or cross-like substrate, the second antenna modules and the third antenna modules are located on the sections of the cross-shaped or cross-like substrate.

5. The system according to claim 1, wherein the substrate is a square substrate, the square substrate has four sides and four corners, wherein the first antenna modules are located on the four sides of the square substrate, the second antenna modules and the third antenna modules are located on the four corners of the square substrate.

6. The system according to claim 1, wherein the substrate is an octagonal substrate, the octagonal substrate has eight sides, and the first antenna modules, the second antenna modules, and the third antenna modules are respectively located on the eight sides.

7. The system according to claim 1, wherein the first antenna modules located on the two opposite first sides have a same first polarization direction, and the first antenna modules located on the two opposite second sides have a same second polarization direction, and the first polarization direction is different from the second polarization direction.

8. The system according to claim 1, wherein the first antenna modules located on the two opposite first sides respectively have a first polarization direction and a second polarization direction, and the first antenna modules located on the two opposite second sides respectively have a first polarization direction and a second polarization direction, and the first polarization direction is different from the second polarization direction.

9. The system according to claim 1, wherein the first antenna modules and the third antenna modules support 4×4 multi-input multi-output (MIMO) wireless communication technology, and the second antenna modules and the first antenna modules are designed to support the 4×4 multi-input multi-output (MIMO) wireless communication technology.

10. The system according to claim 1, wherein the multi-antenna module system is held on a rotatable antenna base and is driven to rotate by a controller.

* * * * *